May 11, 1965 A. I. W. MOORE ET AL 3,182,531
REAMER
Filed Aug. 1, 1962 3 Sheets-Sheet 1

Inventors
Arthur I. W. Moore
John H. Porter
By
Atty.

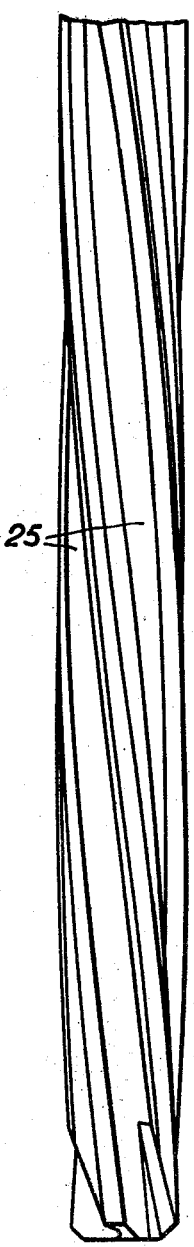
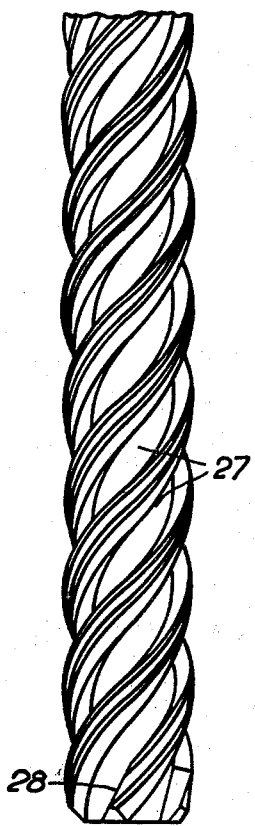
Fig. 6.
Fig. 5.
Inventors
Arthur I. W. Moore
John H. Porter
By
Atty.

May 11, 1965   A. I. W. MOORE ET AL   3,182,531
REAMER

Filed Aug. 1, 1962   3 Sheets-Sheet 3

Inventors
Arthur I. W. Moore
John H. Porter
By Guster H. Emery
Atty.

ically in FIGURE 3, at 29, and is of low value.

United States Patent Office 3,182,531
Patented May 11, 1965

3,182,531
Melton Mowbray, England
Arthur I. W. Moore and John H. Porter, Staveley Lodge, Melton Mowbray, England, assignors to Production Engineering Research Association of Great Britain, Melton Mowbray, England, a corporation of Great Britain
Filed Aug. 1, 1962, Ser. No. 214,099
Claims priority, application Great Britain, Aug. 4, 1961, 28,490/61
18 Claims. (Cl. 77—72)

This invention relates to reamers, the teeth of which, according to the present invention, each have a circular land followed by a secondary clearance surface. The cutting edge of each tooth is formed by the intersection with the tooth of an axial rake face of straight line form making an acute angle to the leading edge of the circular land and so forming with the secondary clearance a low bevel lead angle, the form of the secondary clearance surface being such that in passing from the outer corner to the leading end of the cutting edge, the secondary clearance angle diminishes. The axial rake face is suitably a plane surface.

The invention will be further described, with reference to the accompanying drawings, in which:

FIGURE 5 is a side view of a reamer according to the invention with helical flutes, suitable for through holes; and FIGURE 6 is a side view of a reamer according to the invention suitable for blind holes.

FIGURES 4 to 6 are depicted on a smaller scale than FIGURES 1 to 3.

Figure 1:
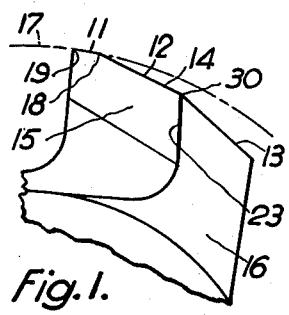
FIGURE 1 is an end view looking at the leading edge of one tooth only of a straight fluted reamer according to the invention.

As shown in FIGURES 1 to 4, especially FIGURE 1, the tooth has a circular land 11, behind which is a secondary clearance surface 12 and behind this is an additional clearance surface 13. The cutting edge 14 is formed by grinding a plane axial rake face 15 at an acute angle (see especially FIG. 2) to the leading edge 21 of the circular land. The drawing shows a suitable angle which is about 25° but manifestly this is not a limiting value. There is also a conical bevel 16 ground on the leading end of the reamer.

Due to the secondary clearance surface 12 necessarily extending below the full diameter 17 cut by the reamer and having a continuously decreasing radius about the axis of the reamer, the formation of the rake face 15 necessarily produces a bevel lead which is visible in FIGURE 3, at 29, and is of low value.

The outer corner 18 of the reamer that is the end 18 of the cutting edge 14 which describes the full diameter 17 of the reamed hole is not at the junction 19 of the axial rake face 15 with the leading edge 21 of the circular land 11, but is on the junction line 22 between the trailing edge of the circular land and the secondary clearance surface 12. Thus this corner 18 occupies a protected position such that it is not affected by blunting of the leading edge 21 of the circular land.

All the cutting by the reamer is effected by the cutting edges 14 and it will be clear that as these cutting edges can be completely renewed by regrinding, apart from wear on the circular lands, which is negligible, regrinding completely restores the reamer. It will be seen that all the cutting edges are substantially at the same longitudinal location, thus ensuring that cutting is shared between them.

In particular regrinding effects a complete renewal of a worn outer corner 18 and restores the reamer completely so far as cutting efficiency is concerned. Very little material needs to be removed in regrinding, so the reamer may be reground many times, and each time will give a performance equivalent to its performance when new. A further advantage is that, due to the secondary clearance surface, i.e. the tooth flank not being reground, any inaccuracies in regrinding have but little effect in introducing undesirable differences between the teeth leading to differences in chip thickness from tooth to tooth.

The secondary clearance angle has an appropriate value at the point 18—the junction of lines 14 and 22—and decreases continuously to a value which is not less than a very small negative value near the other end of the cutting edge 14 at the point 30. Desirably the secondary clearance surface 12 is of such form and width that the secondary clearance angle diminishes within a depth of cut appropriate to the size and nature of the reamer, approximately to zero as at 30. The low, zero or slightly negative clearance angle here according to which the width of the surface 12 is slightly less than, equal to or slightly more than brings the secondary clearance angle to zero, has the effect of suppressing lobing or regenerative chatter.

A secondary clearance angle which diminishes in the required manner is suitably provided as shown in the drawings by a secondary clearance surface the section of which in planes normal to the leading edge of the circular land is a straight line. In the case of a straight fluted reamer this produces a plane secondary clearance surface which is ground parallel to the axis of the reamer. It is necessary in practice to allow for a range of depths of cut for any given size of reamer. Further with a plane secondary clearance face and an appropriate value of the secondary clearance angle immediately behind the circular land, an appropriate minimum value of the secondary clearance angle of approximately zero is reached in a circumferential distance less than the circumferential width of a usual suitable tooth section. The additional clearance surface 13 avoids an excessive negative clearance angle which would be obtained if the secondary clearance surface were widened over a usual tooth width and which would cause undue interference during cutting and this additional clearance surface suitably has a section which in planes normal to the leading edge of the tooth is a straight line. In the case of a straight fluted reamer this additional clearance surface will again be plane, parallel to the axis of the reamer.

Figure 3:
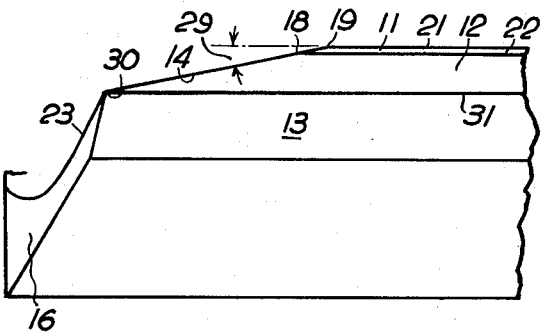
FIGURE 3 is a side view of FIGURE 1.
Figure 2:
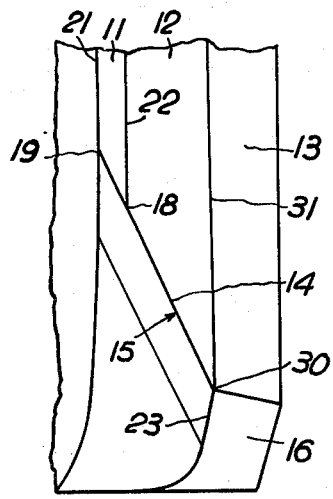
FIGURE 2 is a plan view of FIGURE 1.

As shown in FIGURES 1 to 3 the conical bevel 16 has been ground so far back that the cutting edge 14 just terminates at 30 on the junction 31 of the secondary clearance surface 12 with the additional clearance surface 13. However, the conical bevel 16 need not be ground so far back. A compound cutting edge may be produced by the intersection of the axial rake face 15 with the two surfaces 12, 13 and the compound cutting edge may be terminated by the conical bevel which may be used to limit the length of that segment of the cutting edge formed by the intersection of the faces 13 and 15 instead of eliminating it as in FIGURES 1 to 3.

The use of a conical bevel helps in centering the reamer as it enters the drilled hole, and so eliminates the risk of damage to the reamer teeth. When a conical bevel is used, part of the cutting may be done by its own cutting edges 23 formed by the intersection of the flutes with the conical surface; the flank surfaces lying behind these cutting edges have zero clearance, leading to moderate interference which will also tend to suppress lobing and regenerative chatter. The cutting edges 14 formed by the intersection of the secondary clearance face 12 with the axial rake face 15 should desirably cut out at least three quarters of the depth of cut.

Reamers according to the present invention, and having equally spaced teeth and zero or uncontrolled cutting edge differences and without the conical bevel 16 will produce holes of acceptable quality for some classes of work. It is to be understood that by "uncontrolled" is meant that the grinding of the cutting edges is within the usual manufacturing tolerances of reamer manufacture without special care to ensure that the differences and hence the chip thickness from tooth to tooth are related in a desired manner. Where care is taken to keep the differences and chip thickness related in a desired manner from tooth to tooth, the differences are said to be controlled. Where requirements are more exacting, superior quality holes, in which lobing and chatter are reduced to a minimum may be produced by introducing unequal spacing of the teeth and/or controlled cutting edge difference at the manufacturing stage and/or the conical bevel 16.

Figure 8:
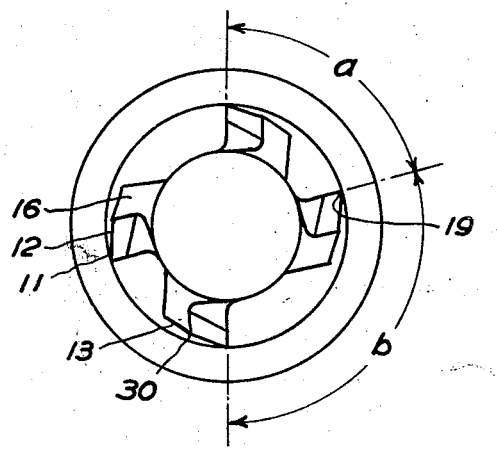
FIG. 8 is an end view of the reamer of FIG. 7.

Unequal spacing of the teeth is shown in FIG. 8 where the angles $a$ are less than the angles $b$ but the differences have been exaggerated over what would be used in practice, to render them clearer to the eye for purpose of illustration.

Figure 4:
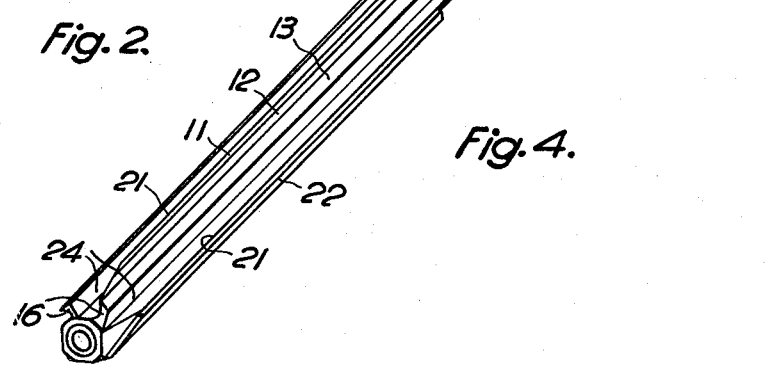
FIGURE 4 is a perspective view of a complete reamer according to the invention, having straight flutes.
Figure 7:
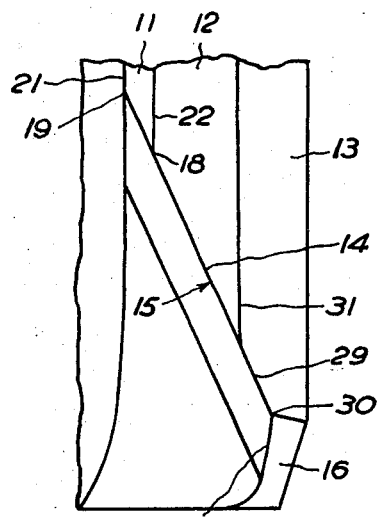
FIG. 7 is a partial side view of a modified reamer having unequally spaced teeth.

For through holes, the reamer may have straight flutes 24 as in FIGURE 4, left hand flutes 25 as in FIGURE 5 or even slightly right-hand helical flutes. The helix angle is not critical but usually a maximum of 10° is convenient. The axial rake is then left-handed and the angle may range from 10° to 30°, but is usually not more than 20°. For blind holes, as shown in FIGURE 6, right-hand helical flutes 27 are used, but the axial rake 28 is then also right-handed as in FIGURE 6. For adequate swarf disposal in this case a rather greater helix angle is required, from 20° to 60° but usually not more than 35°. A suitable axial rake angle is then 15° to 30°—usually not less than 20°. It will be clear that if the axial rake face is to be right-handed the rake angle must be less than the helix angle. It will be understood that the references to handedness assume that the reamer rotates clockwise when viewed from behind. In all cases the helix angle and the axial rake angle should be chosen within these ranges so that the protected outer corner 18 is produced.

A reamer constructed as described above may tend to cut holes slightly smaller in diameter than the reamer diameter, so that burnishing takes place between the circular lands and the wall of the reamed hole. With some materials this may improve the surface finish, but in others it can cause the work material to adhere to the lands, resulting in scoring of the reamed hole surface. This undesirable effect can be reduced in two ways: first by subjecting the reamer to suitable treatment, for example steam treatment in the case of a high speed steel reamer; and secondly by adjusting the radial disposition of the axial rake face 15, while keeping the bevel lead angle constant.

The constructions described above are directly applicable to machine reamers; but they can also be used for hand reamers if the axial rake and secondary clearance angles are selected so as to produce a very small bevel lead angle such as would be used on a hand reamer.

We claim:

1. A reamer comprising a shank and a plurality of teeth, each tooth including a circular land, a secondary clearance surface following the circular land with a continuously decreasing radius and making a clearance angle which has an appropriate value at the junction of the secondary clearance surface with said circular land but which continuously decreases with distance therefrom down to a value which is not less than a very small negative value at the other end of the secondary clearance surface, and axial rake face making a negative acute angle to the leading edge of said circular land, and a cutting edge formed by the intersection of said axial rake face with said secondary clearance surface.

2. A reamer according to claim 1 in which said rake face is a plane surface.

3. A reamer according to claim 1 in which the teeth are unequally spaced.

4. A reamer according to claim 1 in which the flutes are straight.

5. A reamer according to claim 1 in which the flutes are helical with a right hand helix and the axial rake face is also right handed.

6. A reamer according to claim 1 treated to reduce adhesion of work material to the lands.

7. A reamer according to claim 1, in which the radial disposition of the axial rake face is so adjusted as to minimise adhesion of work material to the lands.

8. A reamer according to claim 1 in which the differences between the cutting edges from tooth to tooth are controlled.

9. A reamer according to claim 1, in which said secondary clearance surface is of such width that the secondary clearance angle approximates to zero within a depth of cut appropriate to the size and nature of the reamer.

10. A reamer according to claim 9 in which the section of the secondary clearance surface in planes normal to the leading edge of the circular land approximates to a straight line.

11. A reamer according to claim 9, in which an additional clearance surface is provided behind the line at which the secondary clearance angle approximates to zero.

12. A reamer according to claim 11 in which the section of the additional clearance surface in planes normal to the leading edge of the tooth approximates to a straight line.

13. A reamer according to claim 1 in which a steep conical bevel is formed on the leading end of the reamer.

14. A reamer according to claim 13, in which said conical bevel extends so far back that the cutting edge formed by the intersection of said axial rake face with the tooth just terminates at the junction of said secondary clearance surface with said additional clearance surface.

15. A reamer according to claim 13 in which said axial rake face intersects both said secondary clearance surface and said additional clearance surface thereby to form a compound cutting edge, and said conical bevel extends far enough back to limit the length of that segment of the cutting edge formed by the intersection of the axial rake face with said additional clearance face to a length less than corresponds to the width of said additional clearance face.

16. A reamer comprising a shank and a plurality of axial teeth spaced at unequal angular spacing and each tooth including a circular land, a substantially plane secondary clearance surface following the circular land making a clearance angle which has an appropriate value at the junction of the secondary clearance surface with said circular land and said secondary clearance surface terminating away from said circular land where the clearance angle has fallen to a value approximating zero, a substantially plane further clearance surface following said secondary clearance surface, an axial rake face making a negative angle of the order of between 15° to 25° to the leading edge of said circular land, a cutting edge formed by the intersection of said axial rake face with said secondary clearance surface, all the cutting edges of the reamer being substantially at the same longitudinal location, the reamer also having a steep conical bevel on its leading end extending back at least sufficiently to intersect said additional clearance surface not so far as to intersect any substantial part of said secondary clearance surface.

17. A reamer comprising a shank and a plurality of similar helical teeth having left hand helix angle of up to 10° and disposed at unequal angular spacing, each tooth including a circular land, a secondary clearance surface of substantially straight line section following the circular land making a clearance angle which has an appropriate value at the junction of the secondary clearance surface with said circular land and said secondary clearance surface terminating away from said circular land where the clearance angle has fallen to a value approximately zero, a further clearance surface of substantially straight line section following said secondary clearance surface, a left handed axial rake face making an angle of 10° to 30° to the leading edge of said circular land, a cutting edge formed by the intersection of said axial rake face with said secondary clearance surface, all the cutting edges of the reamer being substantially at the same longitudinal location, the reamer also having a steep conical bevel on its leading end extending back at least sufficiently to intersect said additional clearance surface not so far as to intersect any substantial part of said secondary clearance surface.

18. A reamer comprising a shank and a plurality of similar helical teeth having a right hand helix angle of 20° to 45° and disposed at unequal angular spacing, each tooth including a circular land, a secondary clearance surface of substantially straight line section following the circular land making a clearance angle which has an appropriate value at the junction of the secondary clearance surface with said circular land and said secondary clearance surface terminating away from said circular land where the clearance angle has fallen to a value approximately zero, a further clearance surface of substantially straight line section following said secondary clearance surface, a right handed axial rake face making a negative angle to the leading edge of said circular land having a value in the range 20° to 30° but which is less than the value of said right hand helix angle, a cutting edge formed by the intersection of said axial rake face with said secondary clearance surface, all the cutting edges of the reamer being substantially at the same longitudinal location, the reamer also having a steep conical bevel on its leading end extending back at least sufficiently to intersect said additional clearance surface not so far as to intersect any substantail part of said secondary clearance surface.

References Cited by the Examiner

UNITED STATES PATENTS 2,479,136   8/49   Schade _____ 77—72

FOREIGN PATENTS 141,103   3/35   Austria.

OTHER REFERENCES

American Machinist, "Reference Book Sheet, Sharpening Carbide Reamers . . . 1," page 123, and "Reference Book Sheet, Sharpening Carbide Reamers . . . 11," page 125. (Copy available in Group 340, Class 77–72), dated August 26, 1948 (courtesy The Staples Tool Co.).

American Machinist, volume 39, No. 14, pages 551–555, dated Oct. 2, 1913.

WILLIAM W. DYER, JR., *Primary Examiner.*